No. 710,688. Patented Oct. 7, 1902.
G. E. HEYL-DIA.
MANUFACTURE OF RUBBER HOSE PIPES, RUBBER TUBING, OR THE LIKE.
(Application filed July 11, 1901.)
(No Model.)
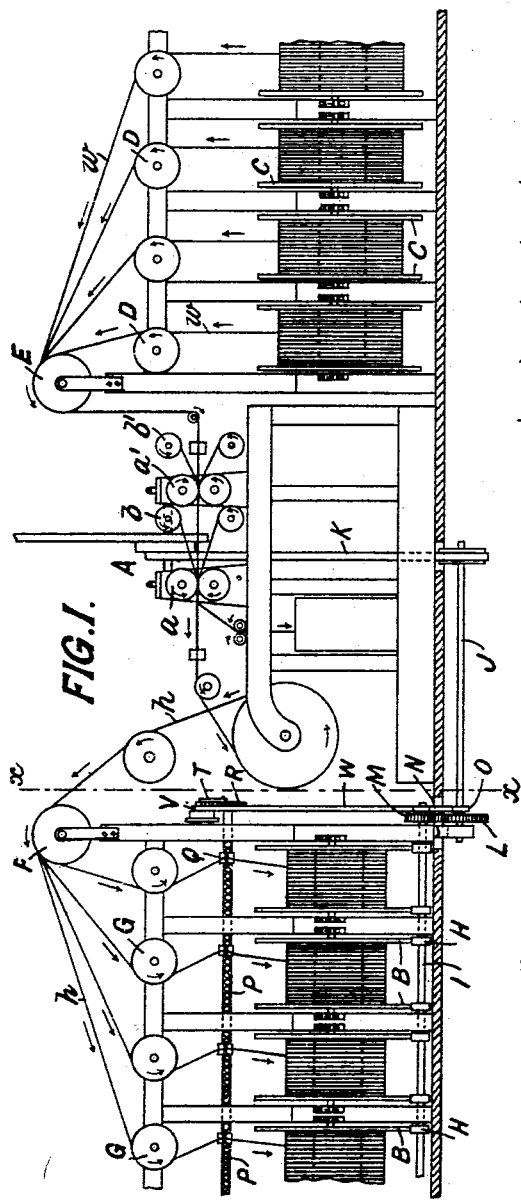
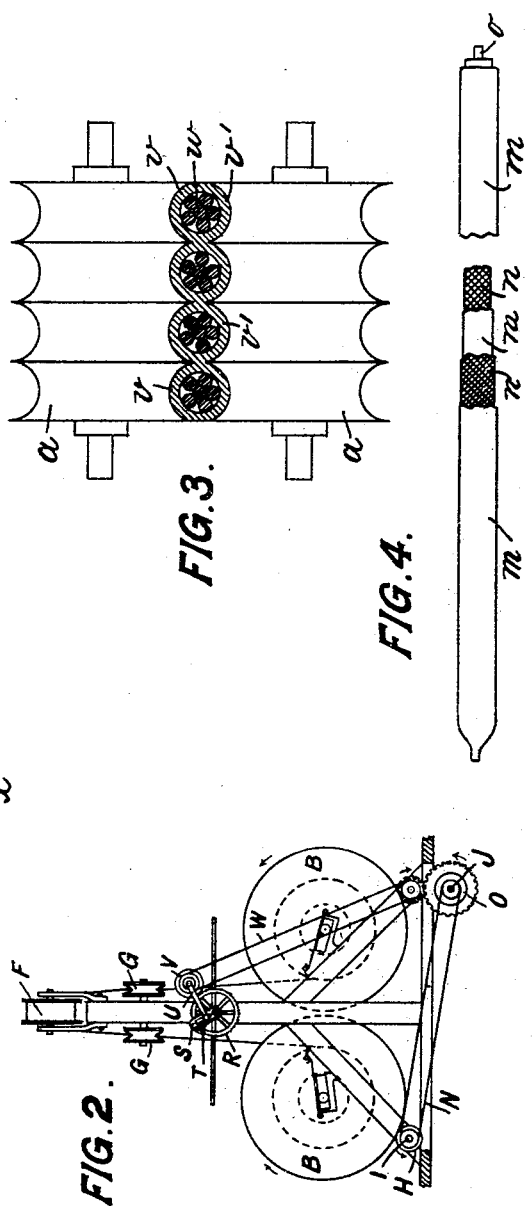

UNITED STATES PATENT OFFICE.

GEORGE EDWARD HEYL-DIA, OF WARRINGTON, ENGLAND.

MANUFACTURE OF RUBBER HOSE-PIPES, RUBBER TUBING, OR THE LIKE.

SPECIFICATION forming part of Letters Patent No. 710,688, dated October 7, 1902.

Application filed July 11, 1901. Serial No. 67,919. (No specimens.)

*To all whom it may concern:*

Be it known that I, GEORGE EDWARD HEYL-DIA, engineer, a subject of the King of Great Britain, residing in Warrington, in the county of Lancaster, England, (whose private address is Birk Crag, 236 Great Clowes street, Higher Broughton, Manchester, in the county of Lancaster, aforesaid,) have invented certain new and useful Improvements in the Manufacture of Rubber Hose-Pipes, Rubber Tubing, or the Like, (for which provisional protection has been made in England under No. 1,157 and dated January 17, 1901,) of which the following is a specification.

This invention relates to the manufacture of rubber hose-pipes, rubber tubes, and the like, and has for its object to greatly cheapen the cost of production by enabling a large number of pipes or tubings to be made at one time and a saving in the amount of material necessary, as compared, for instance, with the squirting process.

I attain the object of my invention by forming the pipes or tubing in the following manner: I take a number of cores, which may be solid, such as wire of the desired thickness, or may be collapsible, such as a hollow rubber core adapted to be inflated with air or other fluid and to be deflated on completion of the process to enable it to be withdrawn from the finished article, and I apply about these cores unvulcanized rubber, with or without other covering materials, in a longitudinal manner by running longitudinal strips of the material above and below the core and passing the whole through grooved rollers, which pinch the upper and lower strips together at the sides and unite them in the manner in which electric conductors are covered longitudinally with insulation. For this purpose I may utilize any existing longitudinal covering-machine at present in use for covering electric conductors; but for the better carrying out of my invention, which requires the covering material and cores to be drawn off the containing-drums in a controlled and definite rate, as required by the working of the pressing-rollers, I prefer to use a longitudinal machine having the automatic haul-off mechanism and also the other improvements, as set forth in my Patent No. 689,614, dated the 24th day of December, 1901.

In order to illustrate the carrying out of my improved process of manufacture, reference will be had to the accompanying drawings, in which—

Figure 1 is a diagrammatic elevation of the longitudinal covering-machine described in my United States patent aforesaid, which I prefer to use. Fig. 2 is a cross-section on the line $x\ x$ of Fig. 1. Fig. 3 is a front view of one pair of grooved rolls on a larger scale, showing the tubing or hose formed about their cores within the grooves. Fig. 4 is a side view of a collapsible core.

The wires $w$, forming the solid cores, are drawn off the feed-drums C, Fig. 1, and pass over the guide-pulleys D E to the grooved rollers $a\ a'$ of the covering device A, several wires being preferably fed to each groove in a parallel manner, as will be seen in Fig. 3, to facilitate withdrawal of the solid core after the tubing has been formed about it, as by withdrawing first the central wire of each core the remaining wires can be easily withdrawn.

A solid core is preferable in most cases; but where a collapsible core is used it may be made of rubber and braiding or canvas or other material having great tensile strength or built up, in fact, or formed something in the same manner as a bicycle-tire at the present time, as shown in Fig. 4, in which $m$ represents the rubber layers, and $n$ the canvas layers, the ends being closed and an inflating-nozzle $o$ provided. The hollow core should be inflated with air or other fluid to a sufficiently hard extent to withstand the pressure of the rollers.

The cores $w$ and the upper and under rubber covering-strips $v\ v'$ drawn off the containing drums or rollers $b\ b'$ or the like pass through the grooved rollers $a\ a'$, by which the two opposing sheets are brought together between the cores and the meeting portions of the strips pressed firmly together and in this manner integrally united, as shown in Fig. 3. This operation results in the formation of a series of tubes each surrounding its core and connected together between the adjacent cores. The hose $h$ thus formed is guided over pulleys F and G to the take-off drums B or is wound on trays in chalk or the like and then vulcanized in the ordinary manner. The take-off drums B are driven by friction-rollers H on the shafts I, which are rotated by gearing K J L M and O N from the driving-shaft of the covering device A, and the cores bearing the hose or tubing h are guided and traversed on the drums B by the traverse mechanism P Q, operated antomatically by the gearing R S T U V W from one of the shafts I, as described in my aforesaid patent. After the vulcanizing the cores w are withdrawn, as before described, from the tubing, of course first deflating if collapsible cores have been used.

The rubber covering material, which is of sufficient width to extend over the upper or under portions of all the cores, can be fed to form a single layer or various layers, according to the number of containing drums or rollers b b' provided, and canvas or braid or other strengthening material may be similarly fed from similar rollers simultaneously in between the rubber covering and the whole pinched together through a single pair of grooved rolls a, or where several layers are applied either one or several pairs of pressing-rolls may be used to receive the partly-formed hose, with a successive application of each layer. The drawings show two pairs of grooved rolls a and a' as an example.

The hose-pipe, rubber tubing, or the like made according to my invention can subsequently be braided or armored in any known manner or can be left simply as it comes from the vulcanizer.

I declare that what I claim is—

The process of making rubber-hose tubing and the like which consists in imparting a feeding movement to a plurality of wires, arranging said wires into groups to form individual cores, each group consisting of a central wire and surrounding wires, applying to opposite sides of the cores opposing sheets of material to form the hose, and feeding the same simultaneously with the cores in the direction of movement of the same, uniting the sheets between the cores, withdrawing the central wire of each core to afford space for the separation of the surrounding wires, and finally withdrawing the remaining wires.

In witness whereof I have hereunto signed my name, this 24th day of June, 1901, in the presence of two subscribing witnesses.

GEORGE EDWARD HEYL-DIA.

Witnesses:
JOSEPH KEDDY,
SIDNEY W. DOD.